United States Patent
Sadaphal et al.

(10) Patent No.: US 10,623,236 B2
(45) Date of Patent: Apr. 14, 2020

(54) ALERT MANAGEMENT SYSTEM FOR ENTERPRISES

(71) Applicant: TATA CONSULTANCY SERVICES LIMITED, Mumbai (IN)

(72) Inventors: Vaishali Paithankar Sadaphal, Pune (IN); Maitreya Natu, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 112 days.

(21) Appl. No.: 14/622,117

(22) Filed: Feb. 13, 2015

(65) Prior Publication Data

US 2016/0164714 A1    Jun. 9, 2016

(30) Foreign Application Priority Data

Dec. 8, 2014 (IN) .......................... 3927/MUM/2014

(51) Int. Cl.
*H04L 12/24* (2006.01)
*H04L 12/26* (2006.01)

(52) U.S. Cl.
CPC ........ *H04L 41/064* (2013.01); *H04L 43/0817* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 6,408,259 B1 | 6/2002 | Goebel et al. | |
| 7,171,689 B2 | 1/2007 | Beavers | |
| 8,660,995 B2 | 2/2014 | Carey et al. | |
| 8,689,050 B2 | 4/2014 | Carey et al. | |
| 2003/0040955 A1* | 2/2003 | Anaya ................ | G06Q 10/0637 705/7.36 |
| 2003/0167406 A1 | 9/2003 | Beavers | |
| 2008/0034425 A1* | 2/2008 | Overcash ................ | G06F 21/55 726/22 |

(Continued)

FOREIGN PATENT DOCUMENTS

| CN | 103414870 | 11/2013 |
|---|---|---|
| EP | 2535813 | 12/2012 |

(Continued)

*Primary Examiner* — Hamza N Algibhah
*Assistant Examiner* — Tony Williams
(74) *Attorney, Agent, or Firm* — Hamre, Schumann, Mueller & Larson, P.C.

(57) ABSTRACT

A method for managing alerts generated in an enterprise environment is described. The method comprises discarding, by a processor, one or more duplicate alerts based on one or more predetermined rules, wherein a duplicate alert is an instance of an alert occurring within a duplicate alert arrival time associated with the alert. The method further comprises obtaining an alert correlation signature associated with the alert from a database, wherein the alert correlation signature comprises information associated with one or more alerts correlated to the alert. The method further comprises, obtaining, from the database, a temporal signature associated with the alert, wherein the temporal signature indicates a probable time of occurrence of the alert. Further, the alert, the alert correlation signature, and the temporal signature are transmitted to a computing device of a user of the enterprise environment.

9 Claims, 2 Drawing Sheets

(56) References Cited

U.S. PATENT DOCUMENTS

| | | | |
|---|---|---|---|
| 2009/0125550 A1* | 5/2009 | Barga | G06F 9/542 |
| 2009/0271348 A1* | 10/2009 | Allen | G06F 16/24565 |
| | | | 706/47 |
| 2009/0271862 A1* | 10/2009 | Allen | H04L 63/1416 |
| | | | 726/22 |
| 2010/0202299 A1* | 8/2010 | Strayer | H04L 63/1408 |
| | | | 370/252 |
| 2012/0137367 A1* | 5/2012 | Dupont | G06F 21/00 |
| | | | 726/25 |
| 2012/0260306 A1* | 10/2012 | Njemanze | G06F 21/554 |
| | | | 726/1 |
| 2012/0331485 A1* | 12/2012 | Carey | G06F 9/542 |
| | | | 719/318 |
| 2013/0027561 A1* | 1/2013 | Lee | G06Q 30/02 |
| | | | 348/150 |
| 2013/0080630 A1 | 3/2013 | Carey et al. | |
| 2013/0179905 A1 | 7/2013 | Atkins et al. | |
| 2013/0298243 A1* | 11/2013 | Kumar | G06F 21/52 |
| | | | 726/25 |
| 2014/0047323 A1* | 2/2014 | Bourke | G06F 17/2247 |
| | | | 715/234 |
| 2014/0068347 A1 | 3/2014 | Carey et al. | |
| 2014/0101307 A1* | 4/2014 | Carey | G06Q 10/06 |
| | | | 709/224 |
| 2014/0195670 A1 | 7/2014 | Jain et al. | |
| 2014/0324867 A1* | 10/2014 | Tee | H04L 41/065 |
| | | | 707/737 |

FOREIGN PATENT DOCUMENTS

| | | |
|---|---|---|
| JP | 2013-054493 | 3/2013 |
| TW | 201403509 | 1/2014 |

\* cited by examiner

ALERT MANAGEMENT SYSTEM FOR ENTERPRISES

TECHNICAL FIELD

The present subject matter relates, in general, to alert management systems for enterprises and, particularly but not exclusively, to managing alerts generated in an enterprise environment.

BACKGROUND

Alert management systems are deployed in enterprises for ensuring smooth operation of enterprise resources, such as applications, processes, central processing unit's (CPUs) usage, and storage space. An alert management system typically monitors operational characteristics of the enterprise resources, and in case an anomaly in the operation characteristics is observed, the alert management system generates an alert. For example, the alert management system may monitor the CPU usage of a desktop and in case the CPU usage increases above a predetermined threshold level, the alert management system may generate an alert. The alert may then be transmitted to a computing device, for example, a desktop computer, of an enterprise personal for resolving the anomaly.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
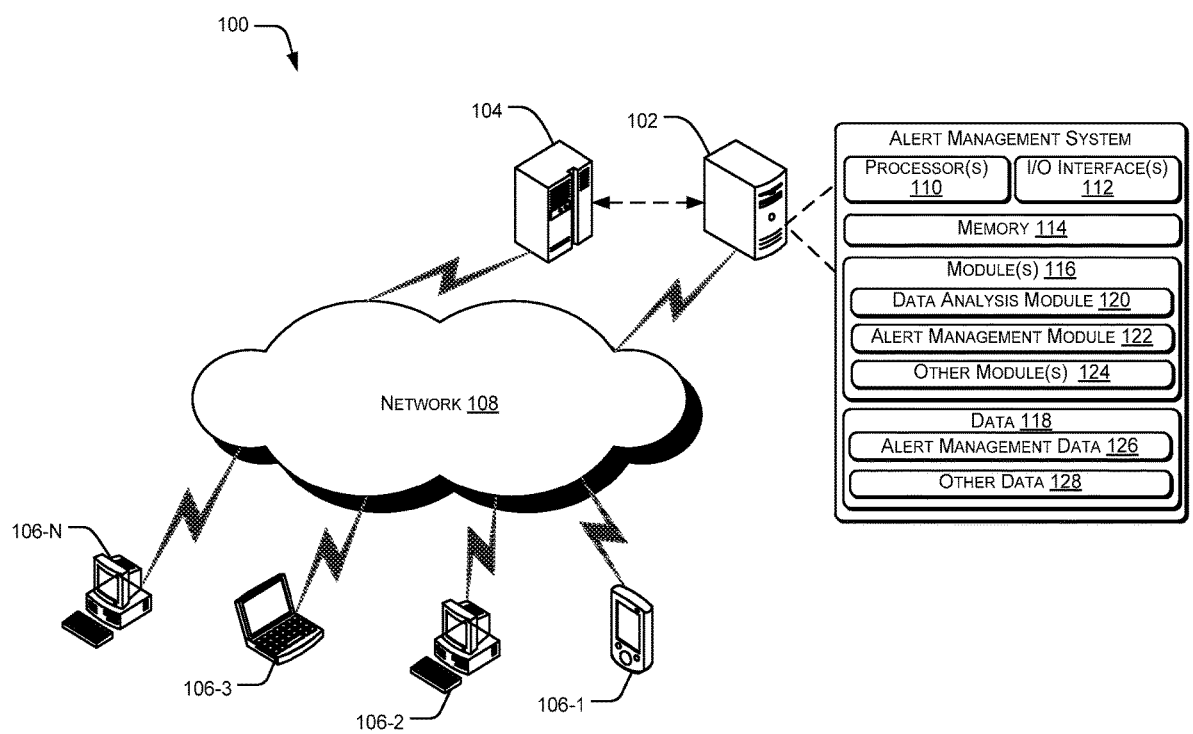
FIG. 1 illustrates an enterprise environment implementing an alert management system for managing alerts generated in the enterprise environment, in accordance with an implementation of the present subject matter.

The present subject matter relates to managing alerts generated in an enterprise environment. The enterprise environment, as described herein, may be understood as an architecture comprising a plurality of computing devices, such as laptops, desktops, workstations, interconnected with each other. The enterprise environment may further include one or more storage devices communicatively coupled to the computing devices.

Enterprises nowadays deploy alert management systems for monitoring enterprise resources, such as application, storage, and servers. Typically, an alert management system generates an alert upon detecting an anomaly in operational characteristics of the enterprise resources. For instance, upon detecting low storage space in the storage devices, the alert management system may generate an alert, say, 'low storage space'. The alert may then be transmitted to a computing device, for example, a desktop, of an enterprise personal for displaying the alert to the enterprise personal. The enterprise personal may then proceed to resolve anomaly.

Conventionally, the alert management system generates the alert repeatedly till the anomaly is resolved. As a result, a plurality of alerts associated with the same anomaly is generated and displayed to the enterprise personal. Such repeated generation of the alerts results in a large volume of alerts. Thus, resolution of the alerts may become a cumbersome and time consuming task. Moreover, as the alerts are monitored manually, probability of an alert getting missed, and thereby, not getting resolved may increase. For instance, in case where a pool of repeatedly generated alerts pertaining to a first anomaly is being displayed to the enterprise personal, the enterprise personal may miss out an other alert, pertaining to a second anomaly, displayed amidst the pool of repeatedly generated alerts. In such a case, the second anomaly may not get resolved and may lead to operational failure of a computing device with which the second anomaly is linked. As a result, overall operation of the enterprise may get affected.

The present subject matter describes systems and methods for managing alerts generated in an enterprise. According to an embodiment of the present subject matter, one or more duplicate alerts associated with an alert may be discarded. A duplicate alert may be understood as an instance of an alert occurring within a duplicate interval time associated with the alert. Discarding the duplicate alerts facilitates in reducing a volume of the alerts generated, which, in turn, facilitates efficient resolution of the anomalies.

According to an aspect, past alert data comprising information associated with a plurality of alerts generated previously may be obtained from a database of the enterprise. The past alert data may then be analyzed for managing alerts generated in future. For instance, in an implementation, the duplicate alert arrival time associated with each of the alerts may be determined based on the past alert data. The duplicate alert arrival time may be understood as a time period within which another instance of the alert may get generated. In said implementation, a time series associated with the alert may be determined based on the past alert data. The time series may indicate a plurality of occurrences of the alert. In an example, based on the time series, the duplicate alert arrival time associated with the alert may be determined. Further, in said implementation, a periodicity associated with the alert may be determined based on the time series. The periodicity may be understood as a time period after which a legitimate alert is generated. The legitimate alert may be understood as an instance of the alert generated after a duration of duplicate alerts. The duration of duplicate alerts may be understood as a time period for which the duplicate alerts are generated.

In addition to the duplicate alert arrival time, an alert correlation signature may be generated based on the past alert data. The correlation signature, as described herein, may include information associated with one or more correlated alerts, i.e., alerts, triggered in the enterprise environment, which are correlated to the alert. In an example, the alert correlation signature may be generated using a correlation technique on the past alert data. Examples of the correlation technique may include, but are not limited to, queue-based correlation, time-series correlation, and classification and regression tress (CART).

Further, in an implementation, a temporal signature associated with the alert may be generated. The temporal signature may indicate a probable time of occurrence of the alert. In an example, the temporal signature may be generated by computing an entropy value corresponding to each of one or more temporal dimensions. A temporal dimension may be understood as a time period based on which a plurality of probability of occurrence of the alert may be generated. For instance, in a case where probability of occurrence of an alert during a day is to be monitored, the probability of occurrence may be computed on an hourly basis. Thus, in such a case, the temporal dimension would be identified as an hour and may be represented as, say, 'hour of day'. Similarly, other examples of temporal dimensions may include, but are not limited to, 'day of week', 'date of month', and 'month of year'. Based on the entropy value, at least one temporal dimension from amongst the temporal dimensions may be selected. Subsequently, the probable time of occurrence of the alert may be ascertained based on the plurality of probability of occurrences of the alert corresponding to the at least one temporal dimension.

In an example, the duplicate alert arrival time, the alert correlation signature, and the temporal signature for each of the alerts may then be stored in the database for managing the alerts in real time.

During operation in real time, in an implementation, the alert management system may discard one or more duplicate alerts corresponding to an alert based on one or more predetermined rules. For example, in accordance with a first rule, the alert management system may discard the duplicate alerts based on a duplicate alert arrival time associated with the alert. In accordance with a second rule, the alert management system may discard the duplicate alerts based on a periodicity associated with the alert.

Subsequently, the alert management system may obtain an alert correlation signature and a temporal signature associated with the alert from the database. The alert management system may then transmit an alert notification comprising the alert, the alert correlation signature, and the temporal signature to the computing device of the enterprise personal for resolving an anomaly linked with the alert.

As will be clear from the foregoing description, duplicate alerts associated with an alert are discarded. As a result, overall volume of alerts generated is reduced. Thus, monitoring of the alerts becomes less cumbersome and complex. Further, identification of the correlated alerts facilitates in taking preemptive measures for averting future anomalies, thereby, ensuring smooth operation of the enterprise resources.

FIG. 1 illustrates an enterprise environment 100 implementing an alert management system 102 for managing alerts, according to an embodiment of the present subject matter. The enterprise environment 100 includes the alert management system 102, a database 104, and a plurality of computing devices 106-1, 106-2, 106-3, . . . , and 106-N, hereinafter collectively referred to as computing devices 106 and individually referred to as a computing device 106. The alert management system 102, hereinafter referred to as the system 102, manages a plurality of alerts generated due to operations performed by the computing device 106. In an implementation, the system 102 may be implemented as one or more systems, a cloud server, a mainframe computer, a workstation, a multiprocessor system, a network computer, and a gateway server. The database 104 stores information, such as a name, a type, a time of occurrence, associated with each of a plurality of previously generated alerts. The information may be stored as past alert data in the database 104. Examples of the computing devices 106 may include, but are not limited to, a mobile phone, a smart phone, a personal digital assistant (PDA), a tablet, a laptop, a personal computer, a workstation computer, and a desktop computer.

In an example, the system 102, the database 104, and the computing devices 106 may with each other through a network 108. The network 108 may be a wireless network, a wired network, or a combination thereof. The network 108 can also be an individual network or a collection of many such individual networks, interconnected with each other and functioning as a single large network, e.g., the Internet or an intranet. The network 108 can be implemented as one of the different types of networks, such as a local area network (LAN), a wide area network (WAN), and the like. In another example, the system 102 and the database 104 may be directly connected to each other.

Communication links between the system 102, the database 104, and the computing devices 108 are enabled through a desired form of communication, for example, via dial-up modem connections, cable links, digital subscriber lines (DSL), wireless or satellite links, or any other suitable form of communication.

In an implementation, system 102 may include one or more processor(s) 110, I/O interfaces 112, and a memory 114 coupled to the processor 110. The processor 110 can be a single processing unit or a number of units, all of which could include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 114.

The I/O interfaces 112 may include a variety of software and hardware interfaces, for example, interfaces for peripheral device(s), such as a keyboard, a mouse, a display unit, an external memory, and a printer. Further, the I/O interfaces 112 may enable the system 102 to communicate with other devices, such as the database 104, the computing devices 108, web servers (not shown), and other external databases (not shown). The I/O interfaces 112 can facilitate multiple communications within a wide variety of networks and protocol types, including wired networks, for example, local area network (LAN), cable, etc., and wireless networks, such as Wireless LAN (WLAN), cellular network, or satellite. For the purpose, the I/O interfaces 112 include one or more ports for connecting a number of computing systems with one another or to a network.

The memory 114 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the system 102 also includes module(s) 116 and data 118.

The module(s) 116, amongst other things, include routines, programs, objects, components, data structures, etc., which perform particular tasks or implement data types. The module(s) 116 may also be implemented as, signal processor(s), state machine(s), logic circuitries, and/or any other devices or components that manipulate signals based on operational instructions. Further, the module(s) 116 can be implemented in hardware, instructions executed by a processing unit, or by a combination thereof. The processing unit can comprise a computer, a processor, such as the processor 110, a state machine, a logic array, or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the module(s) 116 may be machine-readable instructions (software)

which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via a network connection.

In one implementation, the module(s) 116 further includes a data analysis module 120, an alert management module 122, and other module(s) 124. The other modules 124 may include programs or coded instructions that supplement applications and functions of the system 102.

The data 118 serves, amongst other things, as a repository for storing data processed, received, and generated by one or more of the module(s) 116. The data 118 includes alert management data 126 and other data 128. The other data 128 includes data generated as a result of the execution of one or more modules in the module(s) 116.

According to an implementation, the system 102 may analyze the past alert data comprising the information associated with the previously generated alerts for managing alerts generated in the future. In said implementation, based on the past alert data, the system 102 may determine a duplicate alert arrival time associated with each of the plurality of previously generated alerts. Further, the system 102 may generate an alert correlation signature associated with each of the previously generated alerts. The system 102 may further generate a temporal signature for each of the previously generated alerts.

In an implementation, the data analysis module 120 may determine a duplicate alert arrival time associated with a previously generated alert. For determining the duplicate alert arrival time, the data analysis module 120 initially determines a time series associated with the previously generated alert based on the past alert data. The time series indicates a plurality of occurrences of the previously generated alert. Upon determining the time series, the data analysis module 120 determines a plurality of inter arrival times associated with the previously generated alert based on the time series. An inter arrival time may be understood as a time period between two consecutive occurrences of the previously generated alert. The data analysis module 120 may then cluster the plurality of inter arrival times into one or more clusters using a clustering technique. For instance, the data analysis module 120 may use k-means clustering for clustering the inter arrival times into the clusters.

Upon clustering the inter arrival times into the clusters, the data analysis module 120 may analyze the clusters for identifying a cluster having highest instances of corresponding inter arrival time. Once the cluster with the highest instances of corresponding inter arrival time is identified, the data analysis module 120 computes a mean value of the cluster using known techniques. Subsequently, the data analysis module 120 identifies the mean value of the cluster to be the duplicate alert arrival time. The data analysis module 120 may then store the duplicate alert arrival time associated with the previously generated alert in the alert management data 126. Further, in said implementation, the data analysis module 120 may determine a periodicity of the previously generated alert based on the past alert data.

In another implementation, the data analysis module 120 may generate an alert correlation signature associated with the previously generated alert based on the past alert data. The alert correlation signature comprises information associated with one or more alerts correlated to the previously generated alert. The one or more alerts correlate to the previously generated alert may also be referred to as correlated alerts. In said implementation, the data analysis module 120 may implement a correlation technique on the past alert data for generating the alert correlation signature. Examples of the clustering technique may include, but are not limited to, queue based correlation technique, time-series based correlation technique, and CART correlation technique. The data analysis module 120 may store the alert correlation signature in the alert management data 126.

In yet another implementation, the data analysis module 120 may generate a temporal signature associated with the previously generated alert based on the time series associated with the previously generated alert. The temporal signature indicates a probable time of occurrence of the previously generated alert. For generating the temporal signature, the data analysis module 120 may initially compute a plurality of probability of occurrences of the alert for each of a temporal dimension from amongst a plurality of temporal dimensions. As described earlier, the temporal dimension may indicate a time period, such as a time of day, a day of week, a date of month, and a month of year. Upon computing the probability of occurrences of the alert for each of the temporal dimensions, the data analysis module 120 may compute an entropy value associated with each of the temporal dimensions based on the probability of occurrences of the alert associated with the temporal dimension. Thereafter, the data analysis module 120 may select at least one temporal dimension from amongst the plurality of temporal dimensions based on corresponding entropy value. In an example, for selecting the at least one temporal dimension, the data analysis module 120 may compare an entropy value associated with each of the temporal dimensions with a predetermined threshold value. Based on the comparison, the data analysis module 120 may select the at least one temporal dimension, such that the at least one temporal dimension has an entropy value lower than the predetermined threshold value. Subsequently, the data analysis module 120 may determine the probable time of occurrence of the previously generated alert based on the probability of occurrences of the alert corresponding to the at least one temporal dimension. For instance, the data analysis module 120 may compare the probabilities of occurrence of the alert with a threshold value. Based on the comparison, the data analysis module 120 may identify the one or more probabilities of occurrence having a value greater than the threshold value. Subsequently, based on the one or more probabilities of occurrence of the alert, the data analysis module 120 may ascertain the probable time of occurrence of the previously generated alert.

select one or more probability of occurrences of the alert, from amongst the plurality of probability of occurrences of the alert, for at least one temporal dimension from amongst the temporal dimension. In an example, the data analysis module 120 may compare each of the plurality of probability of occurrences with a threshold value for selecting the at least one probability of occurrence of the previously generated alert. The data analysis module 120 may store the temporal signature in the alert management data 126.

As may be understood, the data analysis module 120 determines a duplicate alert arrival time, an alert correlation signature, and a temporal signature associated with each of the other previously generated alerts in a manner as described above. In an example, the duplicate alert arrival time, the alert correlation signature, and the temporal signature associated with each of the other previously generated alerts may be stored in the alert management data 126 and may be used for managing alerts in real time.

During operation in real time, the alert management module 122 may generate an alert upon receiving a trigger. Upon generation of the alert, the alert management module 122 may access the alert management data 126 and may subsequently obtain a duplicate alert arrival time and a periodicity associated with the alert from the alert management data 126. The alert management module 122 may then discard one or more duplicate alerts associated with an alert based on one or more predetermined rules. In an example, the alert management module 122 may discard the duplicate alerts based on a first rule. In said example, the alert management module 122 may discard all instances of the alert generated within the duplicate alert arrival time associated with the alert. In another example, the alert management module 122 may discard the duplicate alerts based on a second rule. In said example, the alert management module 122 may discard the duplicate alerts based on the periodicity associated with the alert. For instance, the alert management module 122 may discard all instances of the alert which are generated prior to the periodicity of the alert.

Further, the alert management module 122 may obtain an alert correlation signature and a temporal signature associated with the alert from the alert management data 126. The alert management module 122 may then transmit an alert notification comprising the alert, the alert correlation signature associated with the alert, and the temporal signature associated with the alert to a computing device, such as the computing device 106-1, associated with an enterprise personal for resolving an anomaly linked with the alert.

For the purpose of validation of the efficiency of the above described subject matter, an analysis of the volume of alerts generated in an enterprise environment of a bank, in accordance with the principles of the present subject matter was performed. A comparison of the volume of alerts generated in accordance with the present subject matter and a conventional alert management system is stated below in Table 1:

TABLE 1

| Serial no. | Alert Management System | No. of Alerts Generated/Month |
|---|---|---|
| 1 | Conventional Alert Management System | 23085 |
| 2 | Proposed Alert Management System | 15391 |

As observed, for a given month, the conventional alert management system generated 23085 alerts. While, the proposed alert management system generated 15391 alerts. Thus, the proposed alert management system, in accordance with the principles of the present subject matter, reduces the volume of alerts generated. Additionally, as described above, the proposed alert management system provides alert correlation signatures thereby facilitating preemptive resolution for anomalies which may occur in future.

Figure 2:
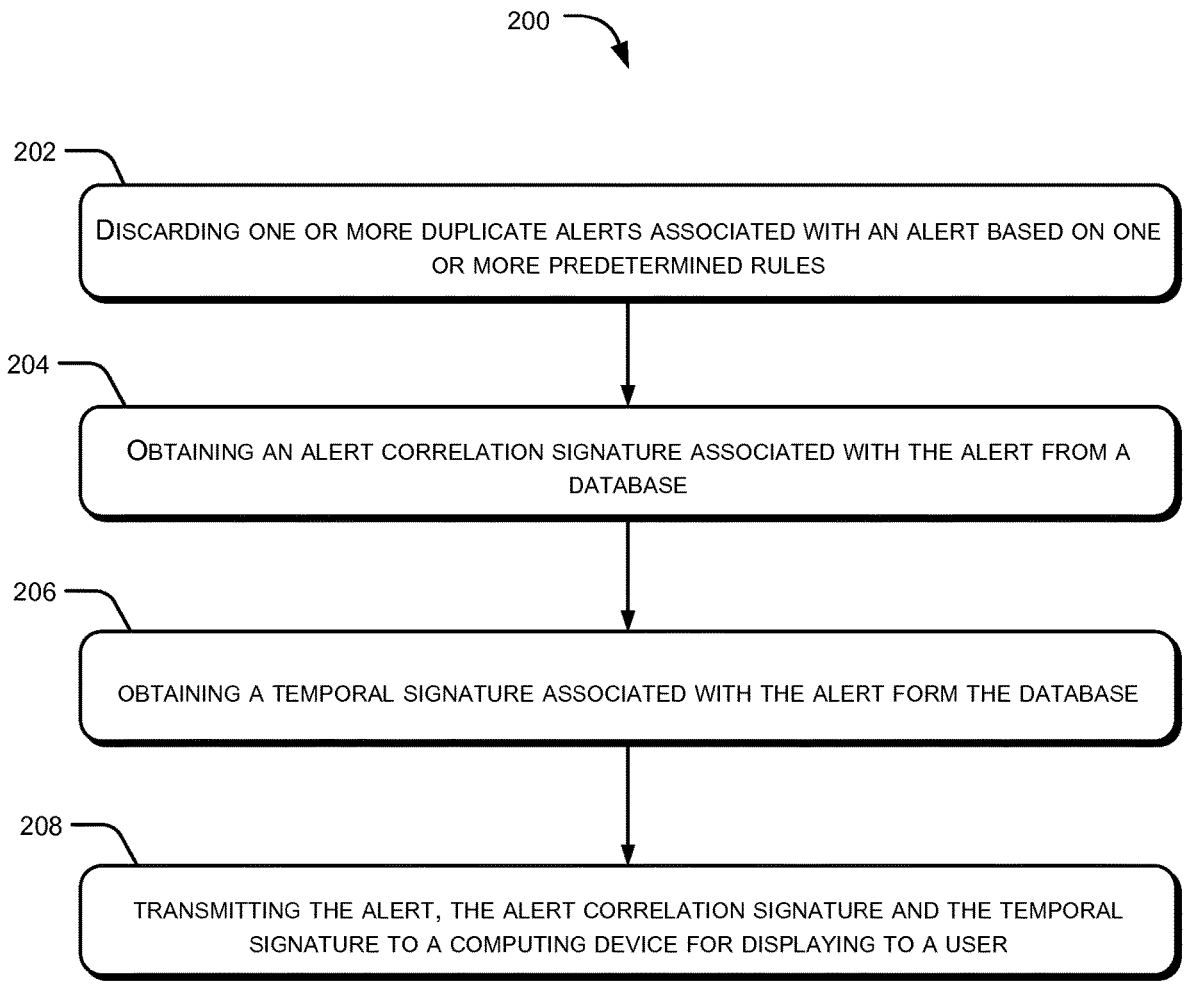
FIG. 2 illustrates a method for managing alerts generated in an enterprise environment, in accordance with an implementation of the present subject matter.

FIG. 2 illustrates a method 200 for managing alerts generated in an enterprise environment, according to an embodiment of the present subject matter. The method 200 may be implemented in a variety of computing systems in several different ways. For example, the method 200, described herein, may be implemented using the system 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the system 102, the description may be extended to other systems as well.

Referring to the FIG. 2, at block 202, one or more duplicate alerts associated with an alert are discarded based on one or more predetermined rules. In an example, based on a first rule based on a duplicate alert arrival time associated with the alert, the duplicate alerts may be discarded. In another example, based on a second rule based on a periodicity associated with the alert, the duplicate alerts may be discarded. In an implementation, the alert management module 122 may discard the duplicate alerts.

At block 204, an alert correlation signature associated with the alert may be obtained from a database. The alert correlation signature comprises information associated with one or more alerts correlated to the alert. For instance, the alert correlation signature may comprise a name, a type, a level, a time of occurrence, a probability of occurrence, associated with the alerts correlated to the alert. In an example, the alert management module 122 may obtain the alert correlation signature from the alert management data 126.

At block 206, a temporal signature associated with the alert may be obtained from the database. The temporal signature may indicate a probable time of occurrence of the alert. Based on the temporal signature, future occurrences of the alert, and hence, an anomaly linked to the alert may be ascertained. In an example, the alert management module 122 may obtain the temporal signature from the alert management data 126.

At block 208, the alert, the alert correlation signature, and the temporal signature are transmitted to a computing device for displaying to a user. In an example, an alert notification comprising the alert, the alert correlation signature, and the temporal signature may be transmitted to the computing device. The alert notification may then be displayed to the user via a display screen of the computing device. Subsequently, the user may resolve the anomaly linked to the alert.

Although implementations for managing alerts generated in an enterprise environment are described, it is to be understood that the present subject matter is not necessarily limited to the specific features or methods described. Rather, the specific features and methods are disclosed as implementations for managing alerts generated in an enterprise environment.

We claim:

1. A method for managing alerts generated in an enterprise environment, the method comprising:

discarding, by a processor, one or more duplicate alerts corresponding to an alert based on one or more predetermined rules, wherein a duplicate alert is an instance of the alert occurring within a duplicate alert arrival time associated with the alert, and wherein the duplicate alert arrival time is measured from an instance of the alert immediately preceding the duplicate alert;

obtaining an alert correlation signature associated with the alert from a database, wherein the alert correlation signature comprises information associated with one or more alerts, triggered in the enterprise environment, correlated to the alert;

analyzing a past alert data from the database, the past alert data comprising information associated with one or more previously generated alerts in the enterprise environment;

determining a plurality of inter arrival times based on a time series, wherein an inter arrival time indicates a time period between two consecutive occurrences of the alert;

clustering the plurality of inter arrival times into one or more clusters based on a clustering technique;

obtaining, from the database, a temporal signature associated with the alert, wherein the temporal signature indicates a probable time of occurrence of the alert, and wherein the temporal signature is generated by:

determining a plurality of probability of occurrences of the alert for each of a plurality of temporal dimensions based on the time series, wherein a temporal dimension indicates a time period;

computing an entropy value associated with each temporal dimension from amongst the plurality of temporal dimensions based on the plurality of occurrences of the alert associated with the temporal dimension;

selecting at least one temporal dimensions from amongst the plurality of temporal dimensions based on corresponding entropy value; and determining the probable time of occurrence of the alert based on the plurality of probability of occurrences associated with the at least one temporal dimension; and transmitting the alert, the alert correlation signature, and the temporal signature to a computing device of a user of the enterprise environment.

2. The method as claimed in claim 1, wherein each of the one or more alerts correlated to the alert is determined based on a correlation technique.

3. The method as claimed in claim 1, wherein the temporal signature is determined based on a time series associated with the alert.

4. The method as claimed in claim 1, wherein the method further comprises obtaining the past alert data comprising information pertaining to a plurality of alerts from a database.

5. The method, as claimed in claim 1, wherein the past alert data comprises information associated with the plurality of occurrences of the alert.

6. An alert management system comprising;
a processor;
an alert management module coupled to the processor to,
discard one or more duplicate alerts based on one or more predetermined rules, wherein a duplicate alert is an instance of an alert occurring within a duplicate alert arrival time associated with the alert, and wherein the duplicate alert arrival time is measured from an instance of the alert immediately preceding the duplicate alert;

obtain an alert correlation signature associated with the alert from a database, wherein the alert correlation signature comprises information associated with one or more alerts correlated to the alert;

analyze a past alert data from the database, the past alert data comprising information associated with one or more previously generated alerts in the enterprise environment;

determine a plurality of inter arrival times based on a time series, wherein an inter arrival time indicates a time period between two consecutive occurrences of the alert;

cluster the plurality of inter arrival times into one or more clusters based on a clustering technique;

obtain, from the database, a temporal signature associated with the alert, wherein the temporal signature indicates a probable time of occurrence of the alert, and wherein the temporal signature is generated by:

determining a plurality of probability of occurrences of the alert for each of a plurality of temporal dimensions based on the time series, wherein a temporal dimension indicates a time period;

computing an entropy value associated with each temporal dimension from amongst the plurality of temporal dimensions based on the plurality of occurrences of the alert associated with the temporal dimension;

selecting at least one temporal dimensions from amongst the plurality of temporal dimensions based on corresponding entropy value; and determining the probable time of occurrence of the alert based on the plurality of probability of occurrences associated with the at least one temporal dimension; and transmit the alert, the alert correlation signature, and the temporal signature to a computing device of a user of the enterprise environment.

7. The alert management system as claimed in claim 6, wherein the alert management system further comprises:
a data analysis module coupled to the processor to,
determine a time series associated with the alert based on past alert data, wherein the time series indicates a plurality of occurrences of the alert;

determine the duplicate alert arrival time associated with the alert based on the time series;

generate the alert correlation signature associated with the alert based on a correlation technique and the past alert data, wherein the alert correlation signature comprises information associated with one or more alerts correlated to the alert; and generate the temporal signature associated with the alert based on the time series, wherein the temporal signature indicates a probable time of occurrence of the alert.

8. The alert management system as claimed in claim 6, wherein the data analysis module further is to,
identify a cluster from amongst the one or more clusters having highest instances of corresponding inter arrival time;

compute a mean value of the cluster; and identify the mean value of the cluster to be the duplicate alert arrival time.

9. A non-transitory computer-readable medium having embodied thereon a computer program for executing a method comprising:

discarding, by a processor, one or more duplicate alerts based on one or more predetermined rules, wherein a duplicate alert is an instance of an alert occurring within a duplicate alert arrival time associated with the alert, and wherein the duplicate alert arrival time is measured from an instance of the alert immediately preceding the duplicate alert;

obtaining an alert correlation signature associated with the alert from a database, wherein the alert correlation signature comprises information associated with one or more alerts correlated to the alert;

analyzing a past alert data from the database, the past alert data comprising information associated with one or more previously generated alerts in the enterprise environment;

determining a plurality of inter arrival times based on a time series, wherein an inter arrival time indicates a time period between two consecutive occurrences of the alert;

clustering the plurality of inter arrival times into one or more clusters based on a clustering technique;

obtaining, from the database, a temporal signature associated with the alert, wherein the temporal signature indicates a probable time of occurrence of the alert, and wherein the temporal signature is generated by:

determining a plurality of probability of occurrences of the alert for each of a plurality of temporal dimensions based on the time series, wherein a temporal dimension indicates a time period;

computing an entropy value associated with each temporal dimension from amongst the plurality of temporal dimensions based on the plurality of occurrences of the alert associated with the temporal dimension;

selecting at least one temporal dimensions from amongst the plurality of temporal dimensions based on corresponding entropy value; and determining the probable time of occurrence of the alert based on the plurality of probability of occurrences associated with the at least one temporal dimension; and transmitting the alert, the alert correlation signature, and the temporal signature to a computing device of a user of the enterprise environment.

* * * * *